United States Patent Office 3,209,035
Patented Sept. 28, 1965

3,209,035
STABILIZED FORMALDEHYDE SOLUTIONS
George N. Butter, Terre Haute, Ind., assignor to Commercial Solvents Corporation, New York, N.Y., a corporation of Maryland
No Drawing. Filed Jan. 8, 1962, Ser. No. 165,010
8 Claims. (Cl. 260—606)

My invention relates to stablized formaldehyde solutions. More particularly, my invention relates to formaldehyde solutions stabilized against excessive polymerization and to a method for stabilizing formaldehyde solutions.

Formaldehyde, a product used in large quantities in the chemical industry, is generally transported as a 35–50% aqueous solution. The transportation of such solutions, however, is aggravated by the tendency of formaldehyde to polymerize and then settle out as a polymerized solid from the solution. Polymerization and concurrent deposition increase with decreases in temperature; thus, during the cold seasons, transportation of concentrated formaldehyde solutions becomes impractical.

Various procedures have been attempted to minimize polymerization and solid deposition in formaldehyde solutions. For example, very low concentrations of formaldehyde in the solution on the order of 5–10% can be transported even in cold weather without excessive polymerization and deposition. However, since water is the main component, this method is practical only when small amounts of formaldehyde are transported. Also, various preservatives such as methanol, when incorporated in amounts 15–20% into the formaldehyde solution have demonstrated ability to impede polymerization. The addition of such large amounts of methanol, however, not only is costly but necessitates separation of the methanol from the formaldehyde solution before use can be made of the formaldehyde. More recently it has been found that small amounts of hydroxylamine hydrochloride impede but do not completely prevent polymerization of formaldehyde and deposition from the aqueous solution of the solid polymerized material even under the low temperature conditions. However, the difficulty in using the hydroxylamine hydrochloride is that the materials which polymerize and settle as a solid deposit from the formaldehyde solution on subjugation to lower temperature do not return to solution with a subsequent rise in temperature thus resulting not only in loss of formaldehyde but necessitating the separation of the polymerized solid materials from the formaldehyde solution.

I have now discovered a means whereby formaldehyde solutions of industrial concentrations can be substantially preserved against polymerization and deposition of solid material even when subjected to lower temperatures. More important, however, my invention permits return of polymerized solid materials which have been deposited at low temperatures to solution merely by raising the temperature of the solution.

Generally my invention involves addition of polymerization retarding amounts of oxazolines having the following general formula:

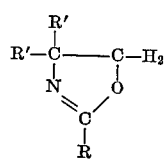

wherein R is lower alkyl and R' is lower alkyl or lower hydroxyalkyl to formaldehyde solutions.

Included among the inhibitors of my invention are oxazolines in which at least 500 p.p.m. are soluble in formaldehyde solutions such as 2, 4, 4-trimethyl-2-oxazoline, 2 - ethyl - 4,4-dimethyl-2-oxazoline, 2-propyl-4,4-dimethyl-2-oxazoline, 2-propyl-4,4-diethyl-2-oxazoline, 2-methyl-4,4-dihydroxymethyl-2-oxazoline, 2 - hexyl-4,4-dihydroxymethy-2-oxazoline, etc., and the like.

In carrying out my improved process, I have found that when amounts as low as 10 p.p.m. and as high as 1,000 p.p.m. by weight of my inhibitors based on the weight of formaldehyde solutions are incorporated in the formaldehyde solution, suitable results can be obtained. However, to obtain optimum results, I usually prefer to utilize from about 100 to about 500 p.p.m. of my inhibitors.

The following examples serve to illustrate my invention, but it is not intended that my invention be limited to the procedures or the specific materials set forth therein.

Example I

A 1,000-milliliter portion of a 44% formaldehyde solution containing a concentration of 100 p.p.m. of 2,4,4-trimethyl-2-oxazoline and a 1,000-milliliter portion of a 44% formaldehyde solution containing no inhibitor were heated to about 100° F. and maintained at that temperature for 30 days. At the end of the 30-day period, the two portions were observed. The first portion containing the inhibitor showed only small amounts of solid deposition while the second portion containing no inhibitor was quite cloudy and showed a great deal of solid deposition. The temperature of the two portions was then lowered to 60° F. and solid deposition occurred in each portion. The two portions were then heated to 120° F. with accompanying agitation. The solid material in the inhibited portion was observed to have substantially disappeared while the solid material in the portion not treated with the inhibitor was observed to be substantially unchanged.

Example II

The procedure of Example I was followed except that 2-ethyl-4,4-dimethyl-2-oxazoline was utilized instead of 2,4,4-trimethyl-2-oxazoline. Results similar to those of Example I were obtained.

Example III

The procedure of Example I was followed with the exception that 2-propyl-4,4-dimethyl-2-oxazoline was utilized instead of 2,4,4-trimethyl-2-oxazoline. Results similar to those of Example I were obtained.

Example IV

The procedure of Example I was followed with the exception that 2-propyl-4,4-diethyl-2-oxazoline was utilized instead of 2,4,4-trimethyl-2-oxazoline. Results similar to those of Example I were obtained.

Example V

The procedure of Example I was followed with the exception that 2-methyl-4,4-dihydroxymethyl-2-oxazoline was utilized instead of 2,4,4-trimethyl-2-oxazoline. Results similar to those of Example I were obtained.

Example VI

The procedure of Example I was followed with the exception that 2-hexyl-4,4-dihydroxymethyl-2-oxazoline was utilized instead of 2,4,4-trimethyl-2-oxazoline. Results similar to those of Example I were obtained.

Now having described my invention, what I claim is:

1. An aqueous formaldehyde solution comprising aqueous formaldehyde and a sufficient amount of a compound having the following general formula:

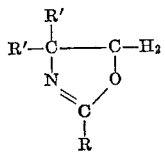

wherein R is lower alkyl and R' is selected from the group consisting of lower alkyl and lower hydroxyalkyl to stabilize said solution against deposition of solid material from the solution.

2. An aqueous formaldehyde solution comprising aqueous formaldehyde and a sufficient amount of 2-methyl-4,4-dihydroxymethyl-2-oxazoline to stabilize said solution against deposition of solid material from the solution.

3. An aqueous formaldehyde solution comprising aqueous formaldehyde and a sufficient amount of 2,4,4-trimethyl-2-oxazoline to stabilize said solution against deposition of polymerized formaldehyde from the solution.

4. An aqueous formaldehyde solution comprising aqueous formaldehyde and a sufficient amount of 2-propyl-4,4-dimethyl-2-oxazoline to stabilize said solution against deposition of polymerized formaldehyde from the solution.

5. An aqueous formaldehyde solution comprising aqueous formaldehyde and a sufficient amount of 2-propyl-4,4-diethyl-2-oxazoline to stabilize said solution against deposition of polymerized material from the solution.

6. An aqueous formaldehyde solution comprising aqueous formaldehyde and from about 10 to about 1,000 p.p.m. of a compound having the following general formula:

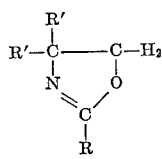

wherein R is lower alkyl and R' is selected from the group consisting of lower alkyl and lower hydroxyalkyl.

7. An aqueous formaldehyde solution comprising aqueous formaldehyde and from about 100 to about 500 p.p.m. of a compound having the following general formula:

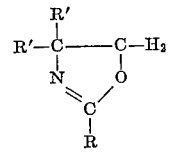

wherein R is lower alkyl and R' is selected from the group consisting of lower alkyl and lower hydroxyalkyl.

8. The solution of claim 6 wherein the aqueous formaldehyde is 35 to 50% water.

References Cited by the Examiner

UNITED STATES PATENTS

| 2,000,152 | 5/35 | Walker | 260—606 |
| 2,517,893 | 8/50 | Larchar | 252—171 |
| 3,033,663 | 5/62 | De Gray | 44—63 |

FOREIGN PATENTS

| 871,196 | 6/61 | Great Britain. |

LEON ZITVER, *Primary Examiner.*

CHARLES B. PARKER, BERNARD HELFIN,
*Examiners.*